3 Sheets—Sheet 1.

O. N. SKAARAAS.
HARVESTER.

No. 189,143. Patented April 3, 1877.

Attest:
Wm. Bagger.
C. A. Snow.

Inventor:
Ole N. Skaaraas,
by Louis Bagger
his Atty.

N. PETERS, PHOTO-LITHOGRAPHER, WASHINGTON, D.C.

3 Sheets—Sheet 2.

O. N. SKAARAAS.
HARVESTER.

No. 189,143. Patented April 3, 1877.

Attest:
Wm. Bagger
C. A. Snow

Inventor:
Ole N. Skaaraas,
by Louis Bagger
his Atty.

N. PETERS, PHOTO-LITHOGRAPHER, WASHINGTON, D. C.

3 Sheets—Sheet 3.

O. N. SKAARAAS.
HARVESTER.

No. 189,143. Patented April 3, 1877.

Attest:
Wm Bagger.
C. A. Snow.

Inventor:
Ole N. Skaaraas,
by Louis Bagger
his Atty

UNITED STATES PATENT OFFICE

OLE NIELSEN SKAARAAS, OF HALE, WISCONSIN, ASSIGNOR OF ONE-HALF HIS RIGHT TO LOUIS BAGGER & CO., OF WASHINGTON, D. C.

IMPROVEMENT IN HARVESTERS.

Specification forming part of Letters Patent No. 189,143, dated April 3, 1877; application filed January 4, 1876.

*To all whom it may concern:*

Be it known that I, OLE NIELSEN SKAARAAS, of Hale, in the county of Trempealeau and State of Wisconsin, have invented certain new and useful Improvements in Reaping-Machines; and I do hereby declare that the following is a full, clear, and exact description thereof, which will enable others skilled in the art to which it appertains to make and use the same, reference being had to the accompanying drawings, and to the letters of reference marked thereon, which form a part of this specification, and in which—

Figure 1:
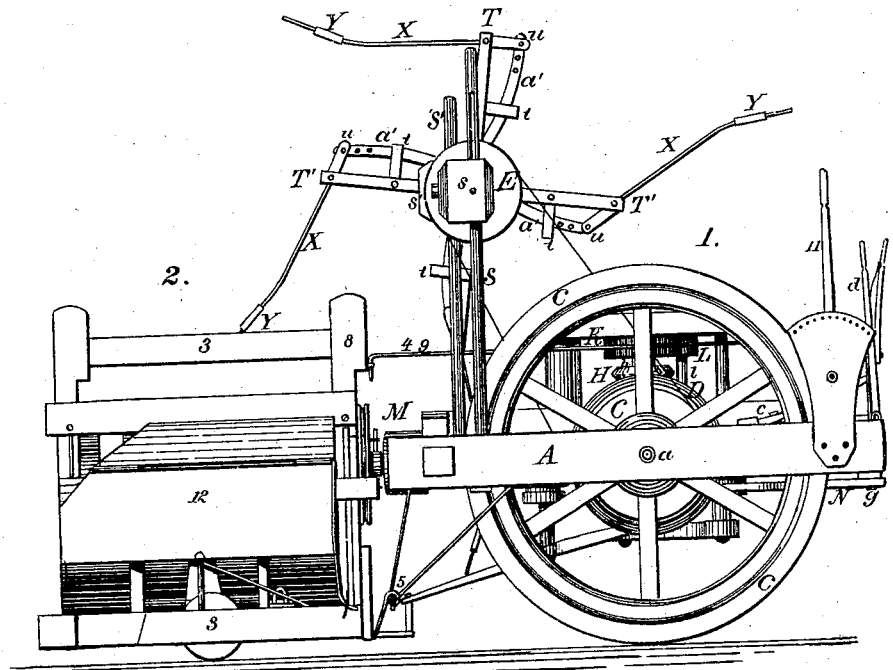
Figure 3:
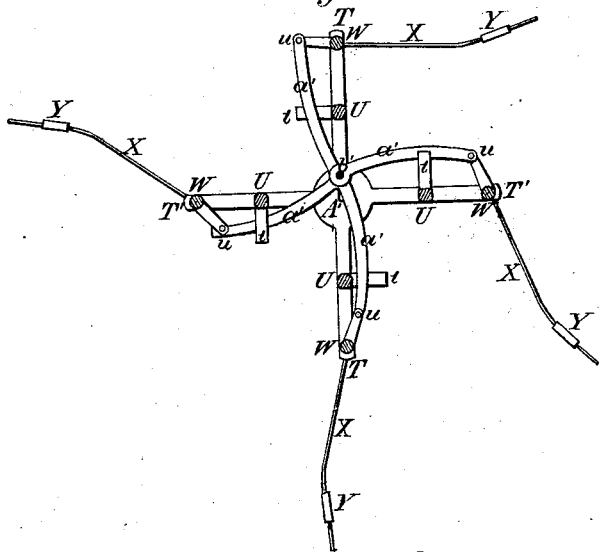
Figure 2:
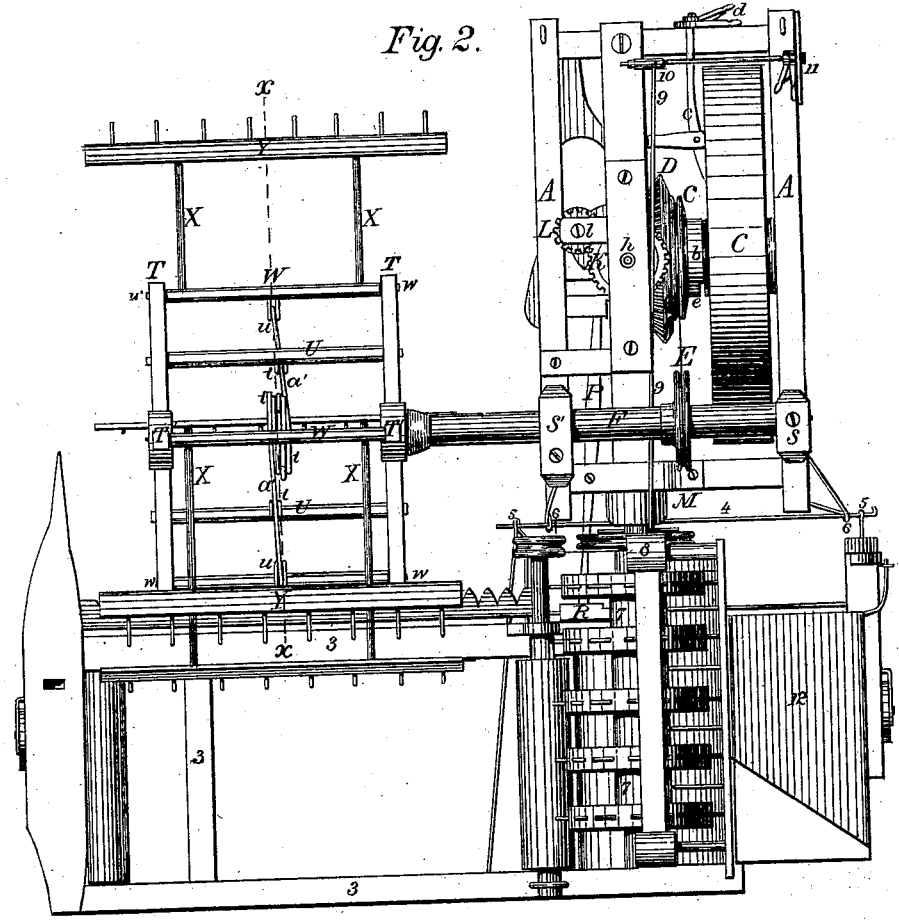
Figure 5:
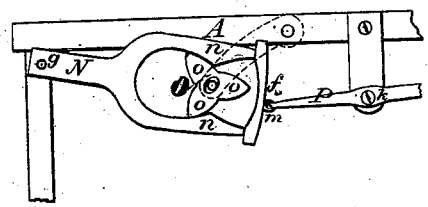
Figure 4:
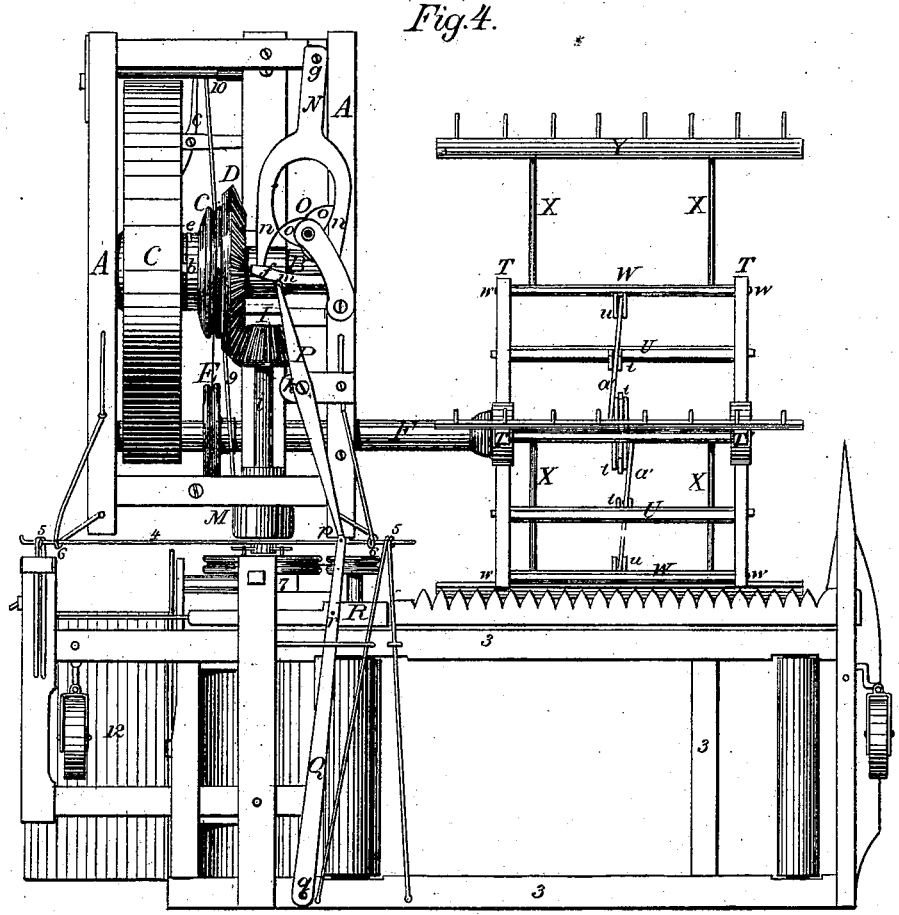

Figure 1 is a side elevation. Fig. 2 is a top plan. Fig. 3 is a vertical section of the reel, after the line indicated by $x\ x$ in Fig. 2. Fig. 4 is a bottom plan. Fig. 5 is a plan view, and Fig. 6 a section of detached parts of the machine.

Similar letters of reference indicate corresponding parts in all the figures.

This invention consists in the improved construction and arrangement of operating parts in a reaper or harvesting machine, as hereinafter more fully described, and pointed out in the claims.

My improved harvester consists of two separate parts, (denoted by 1 and 2 on the drawings.) The front part, 1, carries the drive-wheel, driving machinery, driver's seat, and the reel; and the hind part, 2, consists of the grain-platform, elevator, sickle, and its attachments, and, when used, the binders' table. I shall first proceed to describe the front part.

A is a stout frame, having bearings $a$ for the axle B. The drive-wheel C is set loosely upon this axle, but has a clutch, $b$, which, by the levers $c\ d$, may be made to engage with a clutch-coupling, $e$, secured firmly upon axle B, when it is desired to operate the machine.

Axle B has a pulley, C, and a bevel-wheel, D, keyed firmly onto it. An endless band passes from pulley C to a pulley, E, on the reel-shaft F, by which the reel G is operated. The bevel-wheel D meshes with two pinions. H and I, secured upon the ends of shafts $h\ i$, at right angles to each other. To the other end of shaft $h$, just above the pinion H, is a gear-wheel, K, which meshes with the pinion L of shaft $l$; and the shaft $i$ terminates in a square butt, fitting into an adjustable coupling, M, by which the machinery of part 2 is operated.

To the under side of frame A is pivoted an oscillating arm, N, terminating in a fork, $n\ n$, the two ends of which are united by a cross-bar, $f$. The arms $n\ n$ are of the configuration shown in Fig. 5—that is, triangular in shape, wide in the middle, and tapering to each side, so as to form, with the cross-bar $f$, a recess for the cam O. The latter is secured to the end of the shaft $l$, and consists of three smaller triangular cams, $o\ o\ o$, united at their bases, so as to form the clover-leaf-shaped cam O. (Shown in Fig. 5.) When the shaft $l$ rotates, this cam, by coming in contact with the triangular-shaped sides of the arms $n\ n$, will impart an oscillating motion to lever-arm N, pivoted to the frame A at $g$.

P is a horizontal lever, having its fulcrum at $k$, and pivoted at $m$ to the cross-piece $f$, and at $p$ to another oscillating lever-arm, Q, which has its fulcrum at $g$. The arm Q imparts motion to the sickle-bar, (denoted by R,) which is pivoted adjustably to Q at $r$, as shown in the bottom plan, Fig. 4.

S S' represent uprights or standards, having adjustable bearings $s\ s'$ for the reel-shaft F. The latter terminates in a frame, consisting of two sets of arms, T T', placed at right angles to each other, and united by cross-pieces U W. The former are firmly mortised into the arms T T'; but the latter are pivoted thereto at $w$, as shown.

To the cross-pieces W are fixed arms X, which carry the rakes or beaters Y, that are of the usual construction.

Figure 6:
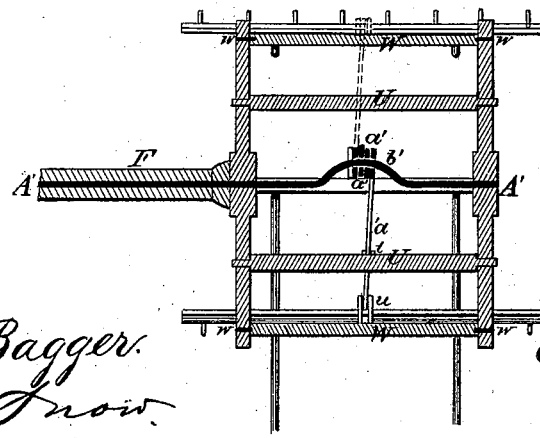

The cross-pieces W, with the arms X and beaters Y, are operated by the device represented in Figs. 3 and 6. This consists of four arms, $a'$, sliding in guides $t$, and pivoted to brackets $u$, projecting downward from the cross-pieces W. At their opposite ends the arms $a'$ are pivoted upon a rod, A', which is firmly secured in the bearing $s$, and passes through the hollow reel-shaft F, so as to remain stationary while the shaft rotates. The rod A' is bent, as shown at b', the arms a' being pivoted to the bent part.

By this arrangement, when the reel-shaft F and arms T T' revolve, the cross-pieces W, with the rakes secured to them, will be turned gradually in their bearings w, operated by the arms a', in such a manner that the rakes Y will be "feathered," and carry the grain straight toward the sickle. In the upward passage of the rakes, these will, by this arrangement, be kept in a standing position toward the grain-platform in part 2, thereby dropping the cut grain gradually before they assume a horizontal position at the top of the reel.

I desire it to be understood, however, that I do not limit myself to the precise construction of the reel herein shown, inasmuch as alterations or changes of details may be made without deviating from the spirit of my invention, which consists, broadly, in a reel having jointed wings, which are connected by rods, or their equivalent, to a cranked shaft, or its equivalent, in such a manner as to impart to the wings an alternately extending and folding motion as the reel revolves. It will readily be perceived that a cam or eccentric placed upon a straight shaft would perform precisely the same function (and would, therefore, be an equivalent therefor) as the bent or cranked portion b' of the shaft A'.

Part 2 of my improved harvester consists of a frame, (denoted by 3,) which is affixed to the front part by a detachable rod, 4, which passes through eyes or bearings in brackets 5 and 6, the former of which are secured to the frame A of the front part of the machine. M is an adjustable coupling, secured to the end of the elevator-shaft 7, directly opposite the square butt-end of the shaft $i$, already described, which fits into a correspondingly-shaped recess in the said coupling. Above the coupling M is affixed, to the upright 8, a rod, 9, which passes forward to a rock-shaft, 10, operated by a handle, 11, within easy reach of the driver. This rod is for the purpose of coupling or uncoupling the rear part (part 2) of the machine, by engaging or disengaging the end of shaft $i$ with the coupling M, so that by this arrangement the machinery of the rear part of the machine may be thrown into or out of operation at the will of the driver, without affecting the operation of the fore part.

The detailed construction of the rear part of the machine may be adapted to the various purposes for which it is intended to be used. In the drawings hereto attached I have shown a grain-platform having an endless band operated by pulleys, carrying the cut grain to an elevator, which deposits it either in a tilting grain-box, 12, or upon a binders' table, that may be substituted for the box; but other constructions of this part of the machine may be used without departing from the spirit of my invention.

By the improvements hereinbefore described I produce a harvesting-machine easy to pull and to operate, and certain of action under all conditions of the grain. It will cut, with equal facility, standing or thrown grain, the construction of the reel being such that the rakes will go in under the grain and lift it up toward the sickle.

After the grain has been cut, the feathering motion of the wings and rakes will cause it to be deposited evenly on the grain-platform, ground, or binders' table, as the case may be. By providing the rods $a'$ with a series of perforations at their ends, the arms or brackets $u$ may be adjusted (by means of a pin or bolt) in such a manner as to regulate the pitch or throw of the wings X and rakes Y, according to the character and condition of the grain, so as to either carry it straight against the sickle, as an ordinary reel, or catch in under the grain and lift it up from the ground against the sickle, as hereinbefore stated.

The fore part of the machine may be detached from the rear part, and attached to another rear part of different construction with little trouble; and the machinery of both parts is so connected that, by means of the rod 9 and lever 10, the connection may be made or detached in a moment, without the driver leaving his seat.

Having thus described my invention, I claim and desire to secure by Letters Patent of the United States—

1. As an improvement in harvesters or reaping-machines, a reel having jointed wings connected by rods with a cranked shaft, whereby the wings are extended and folded as the reel revolves, substantially as and for the purpose hereinbefore set forth.

2. The combination of the forked lever-arm N, constructed as described, and having cross-piece $f$, with the lever P, lever Q, and sickle-bar R, substantially in the manner and for the purpose hereinbefore set forth.

3. The combination of the shaft $i$, adjustable coupling M, upright 8, rod 9, and rock-shaft 10, all arranged and operating substantially in the manner and for the purpose hereinbefore set forth.

In testimony that I claim the foregoing as my own I have hereunto affixed my signature in presence of two witnesses.

OLE NIELSEN SKAARAAS.

Witnesses:
A. H. LEWIS,
C. M. OLSON.